United States Patent
Ho et al.

(10) Patent No.: US 11,081,066 B2
(45) Date of Patent: Aug. 3, 2021

(54) VIA PLACEMENT FOR SLIM BORDER ELECTRO-OPTIC DISPLAY BACKPLANES WITH DECREASED CAPACITIVE COUPLING BETWEEN T-WIRES AND PIXEL ELECTRODES

(71) Applicant: E INK CORPORATION, Billerica, MA (US)

(72) Inventors: Chih-Hsiang Ho, Andover, MA (US); Yi Lu, Needham, MA (US); Yuval Ben-Dov, Cambridge, MA (US); Teck Ping Sim, Acton, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 16/273,334

(22) Filed: Feb. 12, 2019

(65) Prior Publication Data

US 2019/0251911 A1    Aug. 15, 2019

Related U.S. Application Data

(60) Provisional application No. 62/631,261, filed on Feb. 15, 2018.

(51) Int. Cl.
*G09G 3/34* (2006.01)
*G02F 1/1676* (2019.01)
*G02F 1/167* (2019.01)

(52) U.S. Cl.
CPC ............ *G09G 3/344* (2013.01); *G02F 1/167* (2013.01); *G02F 1/1676* (2019.01); *G09G 2320/0219* (2013.01)

(58) Field of Classification Search
CPC ............ G09G 3/344; G09G 2320/0219; G02F 1/1676; G02F 1/167

USPC ........................................................ 345/107
See application file for complete search history.

(56) References Cited

U.S. PATENT DOCUMENTS

| | | | |
|---|---|---|---|
| 4,418,346 A | 11/1983 | Batchelder |
| 5,760,761 A | 6/1998 | Sheridon |
| 5,777,782 A | 7/1998 | Sheridon |
| 5,808,783 A | 9/1998 | Crowley |

(Continued)

FOREIGN PATENT DOCUMENTS

| | | |
|---|---|---|
| CN | 106847864 A | 6/2017 |
| WO | 1999067678 A2 | 12/1999 |

(Continued)

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991). Oct. 24, 1991.

(Continued)

*Primary Examiner* — Chanh D Nguyen
*Assistant Examiner* — Ngan T. Pham-Lu
(74) *Attorney, Agent, or Firm* — Brian D. Bean (57) ABSTRACT

An electro-optic display including an array of pixel electrodes, where each row of pixel electrodes is associated with a source line, and that source line is connected to a drive chip with a T-wire that connects from the back of the substrate to the front of the substrate through a via. The vias are spaced out, such as in a zig-zag pattern or a pseudo-random pattern to reduce the capacitive coupling between the T-wires when adjacent pixels are driven, for example when presenting text characters.

19 Claims, 5 Drawing Sheets

The affected pixels are coupled by one T-wire (b)

(56) References Cited

U.S. PATENT DOCUMENTS

| | | |
|---|---|---|
| 5,872,552 A | 2/1999 | Gordon, II |
| 6,054,071 A | 4/2000 | Mikkelsen, Jr. |
| 6,055,091 A | 4/2000 | Sheridon |
| 6,097,531 A | 8/2000 | Sheridon |
| 6,124,851 A | 9/2000 | Jacobson |
| 6,128,124 A | 10/2000 | Silverman |
| 6,130,773 A | 10/2000 | Jacobson |
| 6,130,774 A | 10/2000 | Albert |
| 6,137,467 A | 10/2000 | Sheridon |
| 6,144,361 A | 11/2000 | Gordon, II |
| 6,147,791 A | 11/2000 | Sheridon |
| 6,172,798 B1 | 1/2001 | Albert |
| 6,177,921 B1 | 1/2001 | Comiskey |
| 6,184,856 B1 | 2/2001 | Gordon, II |
| 6,225,971 B1 | 5/2001 | Gordon, II |
| 6,232,950 B1 | 5/2001 | Albert |
| 6,241,921 B1 | 6/2001 | Jacobson |
| 6,252,564 B1 | 6/2001 | Albert |
| 6,271,823 B1 | 8/2001 | Gordon, II |
| 6,301,038 B1 | 10/2001 | Fitzmaurice |
| 6,312,304 B1 | 11/2001 | Duthaler |
| 6,312,971 B1 | 11/2001 | Amundson |
| 6,376,828 B1 | 4/2002 | Comiskey |
| 6,392,786 B1 | 5/2002 | Albert |
| 6,413,790 B1 | 7/2002 | Duthaler |
| 6,422,687 B1 | 7/2002 | Jacobson |
| 6,445,374 B2 | 9/2002 | Albert |
| 6,480,182 B2 | 11/2002 | Turner |
| 6,498,114 B1 | 12/2002 | Amundson |
| 6,506,438 B2 | 1/2003 | Duthaler |
| 6,518,949 B2 | 2/2003 | Drzaic |
| 6,521,489 B2 | 2/2003 | Duthaler et al. |
| 6,535,197 B1 | 3/2003 | Comiskey |
| 6,545,291 B1 | 4/2003 | Amundson |
| 6,639,578 B1 | 10/2003 | Comiskey |
| 6,657,772 B2 | 12/2003 | Loxley |
| 6,664,944 B1 | 12/2003 | Albert |
| D485,294 S | 1/2004 | Albert |
| 6,672,921 B1 | 1/2004 | Liang |
| 6,680,725 B1 | 1/2004 | Jacobson |
| 6,683,333 B2 | 1/2004 | Kazlas |
| 6,724,519 B1 | 4/2004 | Comiskey |
| 6,750,473 B2 | 6/2004 | Amundson |
| 6,788,449 B2 | 9/2004 | Liang |
| 6,816,147 B2 | 11/2004 | Albert |
| 6,819,471 B2 | 11/2004 | Amundson |
| 6,825,068 B2 | 11/2004 | Denis |
| 6,831,769 B2 | 12/2004 | Holman |
| 6,842,167 B2 | 1/2005 | Albert |
| 6,842,279 B2 | 1/2005 | Amundson |
| 6,842,657 B1 | 1/2005 | Drzaic |
| 6,865,010 B2 | 3/2005 | Duthaler et al. |
| 6,866,760 B2 | 3/2005 | Paolini, Jr. |
| 6,870,657 B1 | 3/2005 | Fitzmaurice |
| 6,922,276 B2 | 7/2005 | Zhang |
| 6,950,220 B2 | 9/2005 | Abramson et al. |
| 6,967,640 B2 | 11/2005 | Albert et al. |
| 6,980,196 B1 | 12/2005 | Turner et al. |
| 6,982,178 B2 | 1/2006 | LeCain et al. |
| 7,002,728 B2 | 2/2006 | Pullen |
| 7,012,600 B2 | 3/2006 | Zehner |
| 7,012,735 B2 | 3/2006 | Honeyman |
| 7,030,412 B1 | 4/2006 | Drzaic et al. |
| 7,075,502 B1 | 7/2006 | Drzaic |
| 7,075,703 B2 | 7/2006 | O'Neil et al. |
| 7,106,296 B1 | 9/2006 | Jacobson |
| 7,110,163 B2 | 9/2006 | Webber et al. |
| 7,116,318 B2 | 10/2006 | Amundson |
| 7,148,128 B2 | 12/2006 | Jacobson |
| 7,167,155 B1 | 1/2007 | Albert |
| 7,170,670 B2 | 1/2007 | Webber |
| 7,173,752 B2 | 2/2007 | Doshi et al. |
| 7,176,880 B2 | 2/2007 | Amundson et al. |
| 7,190,008 B2 | 3/2007 | Amundson et al. |
| 7,206,119 B2 | 4/2007 | Honeyman et al. |
| 7,223,672 B2 | 5/2007 | Kazlas et al. |
| 7,230,751 B2 | 6/2007 | Whitesides |
| 7,236,291 B2 | 6/2007 | Kaga et al. |
| 7,256,766 B2 | 8/2007 | Albert et al. |
| 7,259,744 B2 | 8/2007 | Arango |
| 7,280,094 B2 | 10/2007 | Albert |
| 7,312,784 B2 | 12/2007 | Baucom |
| 7,321,459 B2 | 1/2008 | Masuda |
| 7,327,511 B2 | 2/2008 | Whitesides |
| 7,339,715 B2 | 3/2008 | Webber |
| 7,349,148 B2 | 3/2008 | Doshi et al. |
| 7,352,353 B2 | 4/2008 | Albert |
| 7,365,394 B2 | 4/2008 | Denis et al. |
| 7,365,733 B2 | 4/2008 | Duthaler |
| 7,382,363 B2 | 6/2008 | Albert et al. |
| 7,388,572 B2 | 6/2008 | Duthaler et al. |
| 7,411,719 B2 | 8/2008 | Paolini, Jr. |
| 7,420,549 B2 | 9/2008 | Jacobson |
| 7,442,587 B2 | 10/2008 | Amundson et al. |
| 7,453,445 B2 | 11/2008 | Amundson |
| 7,492,497 B2 | 2/2009 | Paolini, Jr. |
| 7,535,624 B2 | 5/2009 | Amundson et al. |
| 7,551,346 B2 | 6/2009 | Fazel |
| 7,554,712 B2 | 6/2009 | Patry et al. |
| 7,583,427 B2 | 9/2009 | Danner |
| 7,598,173 B2 | 10/2009 | Ritenour |
| 7,605,799 B2 | 10/2009 | Amundson et al. |
| 7,636,191 B2 | 12/2009 | Duthaler |
| 7,649,674 B2 | 1/2010 | Danner |
| 7,667,886 B2 | 2/2010 | Danner |
| 7,672,040 B2 | 3/2010 | Sohn |
| 7,679,814 B2 | 3/2010 | Paolini, Jr. |
| 7,688,497 B2 | 3/2010 | Danner |
| 7,733,335 B2 | 6/2010 | Zehner |
| 7,839,564 B2 | 11/2010 | Whitesides et al. |
| 7,843,626 B2 | 11/2010 | Amundson et al. |
| 7,859,637 B2 | 12/2010 | Amundson et al. |
| 7,893,435 B2 | 2/2011 | Kazlas et al. |
| 7,898,717 B2 | 3/2011 | Patry, Jr. |
| 8,009,348 B2 | 8/2011 | Zehner |
| 8,089,453 B2 | 1/2012 | Comiskey |
| 8,208,193 B2 | 6/2012 | Patry, Jr. |
| 8,319,759 B2 | 11/2012 | Jacobson |
| 8,373,211 B2 | 2/2013 | Amundson |
| 8,389,381 B2 | 3/2013 | Amundson |
| 8,498,042 B2 | 7/2013 | Danner |
| 8,610,988 B2 | 12/2013 | Zehner |
| 8,728,266 B2 | 5/2014 | Danner |
| 8,754,859 B2 | 6/2014 | Gates |
| 8,830,560 B2 | 9/2014 | Danner |
| 8,891,155 B2 | 11/2014 | Danner |
| 9,152,003 B2 | 10/2015 | Danner |
| 9,152,004 B2 | 10/2015 | Paolini, Jr. |
| 9,170,692 B2 | 10/2015 | Yang et al. |
| 9,310,661 B2 | 4/2016 | Wu |
| 9,420,273 B2 | 8/2016 | Zhang et al. |
| 9,620,066 B2 | 4/2017 | Bishop |
| 9,671,635 B2 | 6/2017 | Paolini, Jr. |
| 9,773,855 B2 | 9/2017 | Wu |
| 9,971,218 B2 | 5/2018 | Zou et al. |
| 10,069,012 B2 | 9/2018 | Cho et al. |
| 2002/0060321 A1 | 5/2002 | Kazlas |
| 2004/0105036 A1 | 6/2004 | Danner et al. |
| 2005/0122306 A1 | 6/2005 | Wilcox et al. |
| 2005/0122563 A1 | 6/2005 | Honeyman et al. |
| 2007/0052757 A1 | 3/2007 | Jacobson |
| 2009/0122389 A1 | 5/2009 | Whitesides |
| 2009/0315044 A1 | 12/2009 | Amundson |
| 2011/0140744 A1 | 6/2011 | Kazlas |
| 2011/0187683 A1 | 8/2011 | Wilcox |
| 2011/0292319 A1 | 12/2011 | Cole |
| 2012/0293858 A1 | 11/2012 | Telfer, Jr. |
| 2015/0228666 A1* | 8/2015 | Paolini, Jr. ......... G02F 1/13452 257/72 |
| 2016/0266672 A1* | 9/2016 | Inagaki ................ G09F 9/40 |
| 2016/0322002 A1* | 11/2016 | Tseng ................ G09G 3/344 |
| 2017/0031223 A1* | 2/2017 | Xue ................ G02F 1/13454 |

(56) References Cited

U.S. PATENT DOCUMENTS

2017/0168617 A1* 6/2017 Qu .................. H01L 27/1262
2017/0358265 A1 12/2017 Wang

FOREIGN PATENT DOCUMENTS

| WO | 2000005704 A1 | 2/2000 |
| --- | --- | --- |
| WO | 2000038000 A1 | 6/2000 |
| WO | 2013105347 A1 | 7/2013 |

OTHER PUBLICATIONS

Wood, D., "An Electrochromic Renaissance?" Information Display, 18(3), 24 (Mar. 2002) Mar. 1, 2002.

Bach, U. et al., "Nanomaterials-Based Electrochromics for Paper-Quality Displays", Adv. Mater, vol. 14, No. 11, pp. 345-848 (Jun. 2002). Jun. 5, 2002.

Hayes, R.A. et al., "Video-Speed Electronic Paper Based on Electrowetting", Nature, vol. 425, No. 25, pp. 383-385 (Sep. 2003). Sep. 25, 2003.

Kitamura, T. et al., "Electrical toner movement for electronic paper-like display", Asia Display/IDW '01, pp. 1517-1520, Paper HCS1-1 (2001). Jan. 1, 2001.

Yamaguchi, Y. et al., "Toner display using insulative particles charged triboelectrically", Asia Display/IDW '01, pp. 1729-1730, Paper AMD4-4 (2001). Jan. 1, 2001.

Korean Intellectual Property Office, PCT/US2019/017592, International Search Report and Written Opinion, dated May 28, 2019.

\* cited by examiner (a)            (b)

The affected pixels are coupled by three T-wires

The affected pixels are coupled by one T-wire (a)

FIG. 5

VIA PLACEMENT FOR SLIM BORDER ELECTRO-OPTIC DISPLAY BACKPLANES WITH DECREASED CAPACITIVE COUPLING BETWEEN T-WIRES AND PIXEL ELECTRODES

RELATED APPLICATIONS

This application claims priority to U.S. Provisional Patent Application No. 62/631,261, filed Feb. 15, 2018. All patents and patent applications cited or discussed herein are incorporated by reference in their entireties.

BACKGROUND OF INVENTION

This invention relates to electro-optic display backplanes. More specifically, in one aspect this invention relates to slim border display panels for tiled electro-optic displays, e.g., electrophoretic displays. It would be beneficial to develop systems and methods having reduced capacitive coupling to pixel electrodes in the display panel.

SUMMARY OF THE INVENTION

Accordingly, this invention provides for an electro-optic display, including a driver chip and a backplane. The backplane includes a substrate that has a front side with pixel electrodes arranged in an array including pixel rows and pixel columns. Each of the pixel rows includes a row line (i.e., source line) running parallel to the pixel row, wherein each row line is coupled to a T-wire. The T-wire is also being coupled to the driver chip, and the T-wire runs along a back side of the substrate in a direction substantially perpendicular to the row line. Each T-wire transitions from the back side of the substrate to the front side of the substrate through a via. Each via for each T-wire has a nearest neighbor via, and the via and the nearest neighbor via are separated by at least one pixel column. The nearest neighbor of a via can be identified by drawing consecutive circles with increasing radii, but having a center at the via. The first time a second via is captured by one of the concentric circles, it is a nearest neighbor via. There may be two or more equivalent nearest neighbors based upon radial distance.

In another aspect, the invention provides for an electro-optic display including a driver chip and a backplane. The backplane includes a substrate, the substrate including a viewing surface having a plurality of pixel electrodes arranged in an array of a plurality of pixel rows and a plurality of pixel columns, each of the plurality of pixel rows having a row line associated therewith. A first pixel column of the plurality of pixel columns has a first plurality of T-wires associated therewith, each of the first plurality of T-wires being connected to the driver chip. Each of the first plurality of T-wires is connected to a respective one of a first plurality of row lines by one of a first plurality of vias disposed within the backplane, the first plurality of vias being arranged within the backplane such that vias associated with two adjacent pixel rows are not associated with a same pixel column.

In yet another aspect, the invention provides for an electro-optic display including a driver chip and a backplane. The backplane includes a substrate, the substrate including a viewing surface having a plurality of pixel electrodes arranged in an array of a plurality of pixel rows and a plurality of pixel columns. Each of the plurality of pixel rows has a row line associated therewith, a first pixel column of the plurality of pixel columns having a first plurality of T-wires associated therewith. Each of the first plurality of T-wires is connected to the driver chip, and each of the first plurality of T-wires being connected to a respective one of a first plurality of row lines by one of a first plurality of vias disposed within the backplane. The first plurality of vias are arranged within the backplane such that no two vias are associated with adjacent pixel rows of any pixel column.

The invention additionally includes a large format display including a plurality of electro-optic displays, including a driver chip and a backplane, as described herein. Because of the T-wire arrangement, individual electro-optic displays can be butted together with very little non-active area between the panels. Because the vias are staggered, or arranged in a pseudo-random pattern, the capacitive coupling between the pixel electrodes and the T-wire is greatly reduced, thereby resulting in higher quality images (i.e., better contrast between color states and less remnant image after an image is switched, a.k.a. "ghosting").

In still another aspect, the invention provides for a method of forming an electro-optic display. The method includes providing a driver chip and a backplane, the backplane including a substrate having a plurality of pixel electrodes arranged in an array of a plurality of pixel rows and a plurality of pixel columns, where each of the plurality of pixel rows having a row line associated therewith. The method also includes forming a first plurality of T-wires associated with a first pixel column of the plurality of pixel columns, where each of the first plurality of T-wires being connected to the driver chip. The method further includes forming a first plurality of vias within the backplane such that no two vias are associated with adjacent pixel rows of any pixel column. The method still further includes connecting each of the first plurality of T-wires to a respective one of a first plurality of row lines using one of the first plurality of vias disposed within the backplane.

In yet another aspect, the invention provides for an electro-optic display including a driver chip and a backplane. The backplane includes a substrate, the substrate including a viewing surface having a plurality of pixel electrodes arranged in an array of a plurality of pixel rows and a plurality of pixel columns. Each of the plurality of pixel rows has a row line associated therewith. A pixel column of the plurality of pixel columns has a plurality of T-wires associated therewith. Each of the plurality of T-wires being connected to the driver chip. Each of the plurality of T-wires is connected to a respective one of a plurality of row lines by one of a plurality of vias disposed within the backplane, where the plurality of vias is arranged within the backplane in a zigzag pattern.

DETAILED DESCRIPTION

The use of electro-optic display technology is expanding beyond "typical" display applications like TV screens and monitors to include display products such as electronic books, product labels, retail shelf labels, device monitoring indicators, wristwatches, signs, and promotional or advertising displays. Typically, electro-optic displays are encased by a frame or a bezel to hide the electrical connections of the display which generally lay along the perimeter of the display. In some applications, specifically large-scale tiled displays, it is generally preferred that the entire viewing area of an electro-optic display be optically active; for example, an active billboard made by tiling a plurality of electro-optic displays together to create a large format display. In such applications, consumers prefer that the entire viewing surface of each individual display is optically active and the space between the tiled displays is minimized. When done correctly, the tiled displays take on the look of a single continuous display.

In order to have the least amount of non-active area between tiles, many of the wires (i.e., T-wire) controlling the switching of the thin film transistors (TFTs) are run on the backside of the substrate and then transition to the front of the substrate through a via. Because the substrate is typically made from a nonconductive material, a capacitance is created between a pixel electrode and the multiple T-wires. Because the T-wires are typically arranged in an orderly fashion, it is often the case the multiple T-wires in close proximity are energized at the same time because they are being used to drive transitions of nearby pixel neighbors in the pixel array. This capacitive coupling can lead to unwanted optical defects.

The invention overcomes this capacitive coupling by distributing the T-wires to spread out the capacitive coupling over the entire pixel array. Accordingly, the invention includes an electro-optic display having an array of pixel electrodes, where each row of pixel electrodes is associated with a source line, and that source line is connected to a drive chip with a T-wire that connects from the back of the substrate to the front of the substrate through a via. The vias are spaced out, such as in a zig-zag pattern or a pseudo-random pattern to reduce the capacitive coupling between the T-wires when adjacent pixels are driven, for example when presenting text characters.

The term "backplane" is used herein consistent with its conventional meaning in the art of electro-optic displays and in the aforementioned patents and published applications, to mean a rigid or flexible material provided with one or more electrodes. The backplane may also be provided with electronics for addressing the display, or such electronics may be provided in a unit separate from the backplane. A backplane may contain multiple layers. A backplane may be referred to as a rear electrode structure. The front surface of a backplane refers to the surface closest to the front electrode of the display. The reverse surface of a backplane refers to the surface farthest from the front electrode.

The term "viewing surface" is used herein consistent with its conventional meaning in the art of electro-optic displays and in the aforementioned patents and published applications, to mean the surface closest to the front electrode (the surface remote from the backplane).

The term "non-viewing surface" is used herein to mean any surface or side that is not the viewing surface. This includes the reverse side of a backplane, the sides of a backplane and, if multi-layered, any layer of the backplane that is not on the viewing surface.

Typically, a backplane has an array of pixel electrodes. Each pixel electrode forms part of a "pixel unit" which usually also includes a thin-film transistor, a storage capacitor, and conductors that electrically connect each pixel unit to a driver chip. Although a pixel electrode is technically a subpart of a pixel unit, the terms "pixel" and "pixel electrode" are commonly used interchangeably and refer to a unit cell of a backplane active area. The terms "column lines" and "row lines" generally refer to the "gate lines" and "source lines," respectively, of a pixel transistor. These terms are used interchangeably herein.

Arrays of transistors (e.g. such as that shown in FIG. 2, which may be assembled into arrays such as those shown in FIGS. 1A, 1B, 3A, and 3B) can be manufactured using any one of many appropriate methods. For example, vacuum based methods such as evaporation or sputtering can be used to deposit the materials necessary to form the transistor and thereafter the deposited material can be patterned. Alternatively, wet printing methods or transfer methods can be used to deposit the materials necessary to form the transistors. For fabrication of thin-film transistors, the substrate may be, for example: a silicon wafer, a glass plate; a steel foil; or a plastic sheet. The gate electrodes, for example, may be any conductive material such as metal or conductive polymer. The materials for use as the semiconductor layer, for example, can be inorganic materials such as amorphous silicon or polysilicon. Alternatively, the semiconductor layer may be formed of organic semiconductors such as: polythiophene and its derivatives; oligothiophenes; and pentacene. In general, any semiconductive material useful in creating conventional thin film transistors can be used in this embodiment. The material for the gate dielectric layer may be an organic or an inorganic material. Examples of suitable materials include, but are not limited to, polyimides, silicon dioxide, and a variety of inorganic coatings and glasses. The source and gate electrodes may be made of any conductive material such as metal or conductive polymer. The array of transistors may be any type of transistors used for addressing an electronic display. Additional (i.e., resistors) or alternative (i.e., capacitors and transistors) drive components may be used as well. In another implementation, the addressing electronic backplane could incorporate diodes as the non-linear element, rather than transistors. The present invention is applicable to a variety of electronic displays, including electrophoretic displays, liquid crystal displays, emissive displays (including organic light emitting materials) and rotating ball displays.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range. An electro-optic display may include a liquid crystal display (LCD), a light-emitting diode (LED) or organic light emitting diode (OLED) display, or an electrophoretic display (EPD or EPID).

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Films and sub-assemblies containing electro-optic materials; see for example U.S. Pat. Nos. 6,982,178 and 7,839,564;

(d) Backplanes, adhesive layers and other auxiliary layers and methods used in displays; see for example U.S. Pat. Nos. D485,294; 6,124,851; 6,130,773; 6,177,921; 6,232,950; 6,252,564; 6,312,304; 6,312,971; 6,376,828; 6,392,786; 6,413,790; 6,422,687; 6,445,374; 6,480,182; 6,498,114; 6,506,438; 6,518,949; 6,521,489; 6,535,197; 6,545,291; 6,639,578; 6,657,772; 6,664,944; 6,680,725; 6,683,333; 6,724,519; 6,750,473; 6,816,147; 6,819,471; 6,825,068; 6,831,769; 6,842,167; 6,842,279; 6,842,657; 6,865,010; 6,967,640; 6,980,196; 7,012,735; 7,030,412; 7,075,703; 7,106,296; 7,110,163; 7,116,318; 7,148,128; 7,167,155; 7,173,752; 7,176,880; 7,190,008; 7,206,119; 7,223,672; 7,230,751; 7,256,766; 7,259,744; 7,280,094; 7,327,511;

7,349,148; 7,352,353; 7,365,394; 7,365,733; 7,382,363; 7,388,572; 7,442,587; 7,492,497; 7,535,624; 7,551,346; 7,554,712; 7,583,427; 7,598,173; 7,605,799; 7,636,191; 7,649,674; 7,667,886; 7,672,040; 7,688,497; 7,733,335; 7,785,988; 7,843,626; 7,859,637; 7,893,435; 7,898,717; 7,957,053; 7,986,450; 8,009,344; 8,027,081; 8,049,947; 8,077,141; 8,089,453; 8,208,193; and 8,373,211; and U.S. Patent Applications Publication Nos. 2002/0060321; 2004/0105036; 2005/0122306; 2005/0122563; 2007/0052757; 2007/0097489; 2007/0109219; 2007/0211002; 2009/0122389; 2009/0315044; 2010/0265239; 2011/0026101; 2011/0140744; 2011/0187683; 2011/0187689; 2011/0286082; 2011/0286086; 2011/0292319; 2011/0292493; 2011/0292494; 2011/0297309; 2011/0310459; and 2012/0182599; and International Application Publication No. WO 00/38000; European Patents Nos. 1,099,207B1 and 1,145,072B1;

(e) Color formation and color adjustment; see for example U.S. Pat. No. 7,075,502; and U.S. Patent Application Publication No. 2007/0109219;

(f) Methods for driving displays; see for example U.S. Pat. Nos. 7,012,600 and 7,453,445;

(g) Applications of displays; see for example U.S. Pat. Nos. 7,312,784 and 8,009,348; and (h) Non-electrophoretic displays, as described in U.S. Pat. Nos. 6,241,921; 6,950,220; 7,420,549 and 8,319,759; and U.S. Patent Application Publication No. 2012/0293858.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to SiPix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating, spray coating; meniscus coating; spin coating, brush coating; air knife coating; silk screen printing processes; electrostatic printing processes; thermal printing processes; ink-jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Other types of electro-optic materials may also be used in the present invention. Of particular interest, bistable ferroelectric liquid crystal (FLC's) and cholesteric liquid crystal displays are known in the art.

Other types of electro-optic media may also be used in the displays of the present invention.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

The manufacture of a three-layer electrophoretic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The preferred lamination technique for mass production of displays by this process is roll lamination using a lamination adhesive. Similar manufacturing techniques can be used with other types of electro-optic displays. For example, a microcell electrophoretic medium or a rotating bichromal member medium may be laminated to a backplane in substantially the same manner as an encapsulated electrophoretic medium.

As discussed in the aforementioned U.S. Pat. No. 6,982,178, (see column 3, line 63 to column 5, line 46) many of the components used in electrophoretic displays, and the methods used to manufacture such displays, are derived from technology used in liquid crystal displays (LCD's). For example, electrophoretic displays may make use of a backplane comprising an array of transistors or diodes and a corresponding array of pixel electrodes, and a "continuous" front electrode (in the sense of an electrode which extends over multiple pixels and typically the whole display) on a transparent substrate, these components being essentially the same as in LCD's. However, the methods used for assembling LCD's cannot be used with encapsulated electrophoretic displays. LCD's are normally assembled by forming the backplane and front electrode on separate glass substrates, then adhesively securing these components together leaving a small aperture between them, placing the resultant assembly under vacuum, and immersing the assembly in a bath of the liquid crystal, so that the liquid crystal flows through the aperture between the backplane and the front electrode. Finally, with the liquid crystal in place, the aperture is sealed to provide the final display.

This LCD assembly process cannot readily be transferred to encapsulated displays. Because the electrophoretic material is solid, it must be present between the backplane and the front electrode before these two integers are secured to each other. Furthermore, in contrast to a liquid crystal material, which is simply placed between the front electrode and the backplane without being attached to either, an encapsulated electrophoretic medium normally needs to be secured to both; in most cases the electrophoretic medium is formed on the front electrode, since this is generally easier than forming the medium on the circuitry-containing backplane, and the front electrode/electrophoretic medium combination is then laminated to the backplane, typically by covering the entire surface of the electrophoretic medium with an adhesive and laminating under heat, pressure and possibly vacuum. Accordingly, most prior art methods for final lamination of solid electrophoretic displays are essentially batch methods in which (typically) the electro-optic medium, a lamination adhesive and a backplane are brought together immediately prior to final assembly, and it is desirable to provide methods better adapted for mass production.

Electro-optic displays, including electrophoretic displays, can be costly; for example, the cost of the color LCD found in a portable computer is typically a substantial fraction of the entire cost of the computer. As the use of such displays spreads to devices, such as cellular telephones and personal digital assistants (PDA's), much less costly than portable computers, there is great pressure to reduce the costs of such displays. The ability to form layers of electrophoretic media by printing techniques on flexible substrates, as discussed above, opens up the possibility of reducing the cost of electrophoretic components of displays by using mass production techniques such as roll-to-roll coating using commercial equipment used for the production of coated papers, polymeric films and similar media.

Whether a display is reflective or transmissive, and whether or not the electro-optic medium used is bistable, to obtain a high-resolution display, individual pixels of a display must be addressable without interference from adjacent pixels. One way to achieve this objective is to provide an array of non-linear elements, such as transistors or diodes, with at least one non-linear element associated with each pixel, to produce an "active-matrix" display. An addressing or pixel electrode, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are connected to a row driver, which essentially ensures that at any given moment only one row is selected, i.e., that there is applied to the selected row electrode a voltage such as to ensure that all the transistors in the selected row are conductive, while there is applied to all other rows a voltage such as to ensure that all the transistors in these non-selected rows remain non-conductive. The column electrodes are connected to column drivers, which place upon the various column electrodes voltages selected to drive the pixels in the selected row to their desired optical states. (The aforementioned voltages are relative to a common front electrode, which is conventionally provided on the opposed side of the electro-optic medium from the non-linear array and extends across the whole display.) After a pre-selected interval known as the "line address time" the selected row is deselected, the next row is selected, and the voltages on the column drivers are changed to that the next line of the display is written. This process is repeated so that the entire display is written in a row-by-row manner.

Processes for manufacturing active-matrix displays are well established. Thin-film transistors, for example, can be fabricated using various deposition and photolithography techniques. A transistor includes a gate electrode, an insulating dielectric layer, a semiconductor layer and source and drain electrodes. Application of a voltage to the gate electrode provides an electric field across the dielectric layer, which dramatically increases the source-to-drain conductivity of the semiconductor layer. This change permits electrical conduction between the source and the drain electrodes. Typically, the gate electrode, the source electrode, and the drain electrode are patterned. In general, the semiconductor layer is also patterned in order to minimize stray conduction (i.e., cross-talk) between neighboring circuit elements.

Electro-optic displays are often used to form large area displays, for example in the form of large signs or billboards. Such large area displays are frequently formed by "tiling"

(i.e., juxtaposing) a two-dimensional array of discrete electro-optic displays together since, for technical reasons, such as limitations on the size of backplanes produced by photolithography, individual electro-optic displays cannot economically exceed a certain size. To create the illusion of a single large area display, it is important that the whole visible area of the display be active, with no inactive borders between adjacent displays. Unfortunately, conventional electro-optic displays require driver electronics which are normally disposed around the periphery of the display. Such peripheral driver electronics are not a problem when displays are used individually, since the active area of the display is normally surrounded by a bezel which serves to hide the driver electronics. However, such peripheral driver electronics do create a problem when multiple displays are used to form a large area display since the peripheral areas are inherently optically inactive. Accordingly, there is a need a way of tiling electro-optic displays together to form large area displays without introducing inactive areas in peripheral portions of the individual displays.

Slim border displays (or display panels) may be used in certain arrangements ("tiling") in which a number of such display panels are arranged in a group to produce a larger display. In so doing, it is preferable to reduce or eliminate the border regions on such display panels so that the pixels of adjacent display panels may be as close together as possible, which facilitates joining together multiple such display panels together to create an appearance of a single, continuous array of pixels across the grouping of display panels.

Figure 1A:
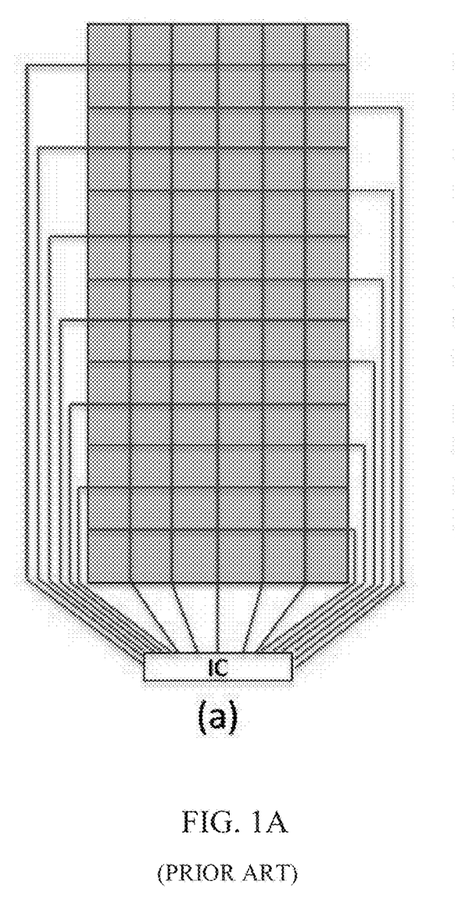
FIG. 1A shows source signal routing in a conventional display panel.

Components that may sometimes be located in a border region of a display panel include lines that lead to pixels, where the lines are used for controlling display of individual pixels, for example changing a color or gray level of one or more individual pixels (FIG. 1A). FIG. 1A shows a single display panel having a series of source lines having connections that run along a border of the display panel.

Figure 1B:
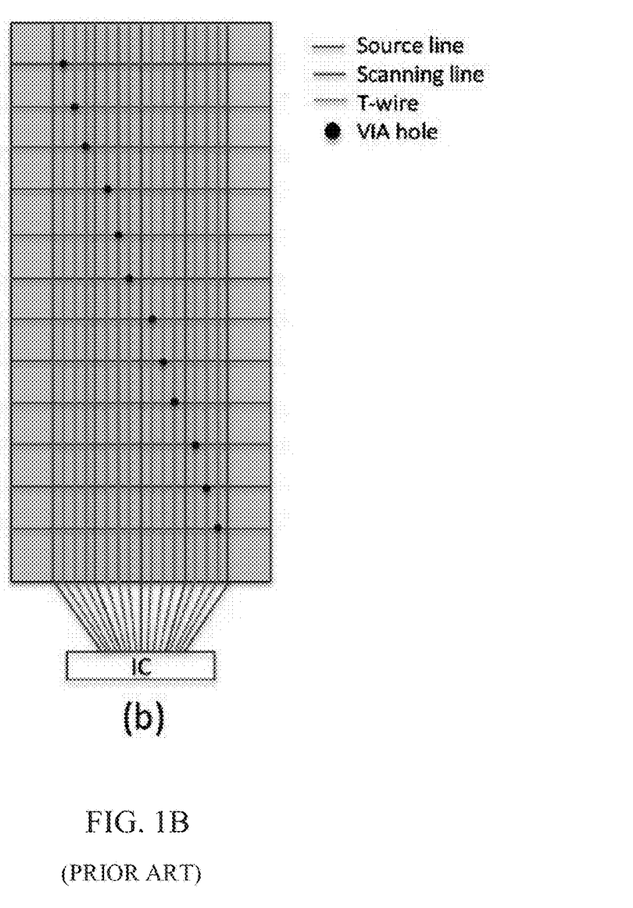
FIG. 1B shows source signal routing in a slim border display panel including T-wires connecting each source line to the controller.

For components such as these, a strategy for reducing or eliminating a need for a border that extends beyond the pixels themselves is to route such lines in the region of the pixel array along a back side of the display panel (i.e., the side opposite the display pixels on a front side of the panel) and through one or more vias (sometimes referred to as "via holes" or "conductive vias") toward the front side of the display panel. For example, as shown in FIG. 1B a series of T-wires run from a driver chip (labeled "IC" in FIG. 1B) along the back side of the display panel and are then electrically coupled to particular source lines on the front side of the panel through individual conductive vias that run through the display panel. (The ICs in FIGS. 1A and 1B may be located on the front or the back of the substrate.) As shown in FIG. 1B, it is typical that one separate T-wire and one separate via are used to establish a connection with each individual source line. In the arrangement shown in FIG. 1B most of the columns of pixels (i.e. the lines of pixels in the long dimension, which are shown as being vertically arranged in FIG. 1B) are associated with three separate T-wires; in various embodiments other numbers of T-wires (e.g. 2, 4, or larger numbers) may be associated with each pixel column. The grouping of T-wires running in the vertical direction typically corresponds to adjacent source lines, as shown in FIG. 1B.

In some embodiments, via apertures (or via holes) are made through the backplane and filled with conductive material to facilitate interconnecting electronic components on the viewing side to electronic components on the reverse side of the backplane. The conductive material may be electronic solder, silver, tin, aluminum, gold, lead, or another conductive metal. The via apertures may be, for example, etched, punched, drilled or laser-drilled through the polymeric material of the backplane so as to connect the electronic components on the viewing side to the drivers on the reverse side. The via apertures may be filled using a variety of materials and techniques including printing (for example, ink-jet, screen, or offset printing) application of conductive resins, shadow-mask evaporation, or conventional photolithographic methods.

Figure 2:
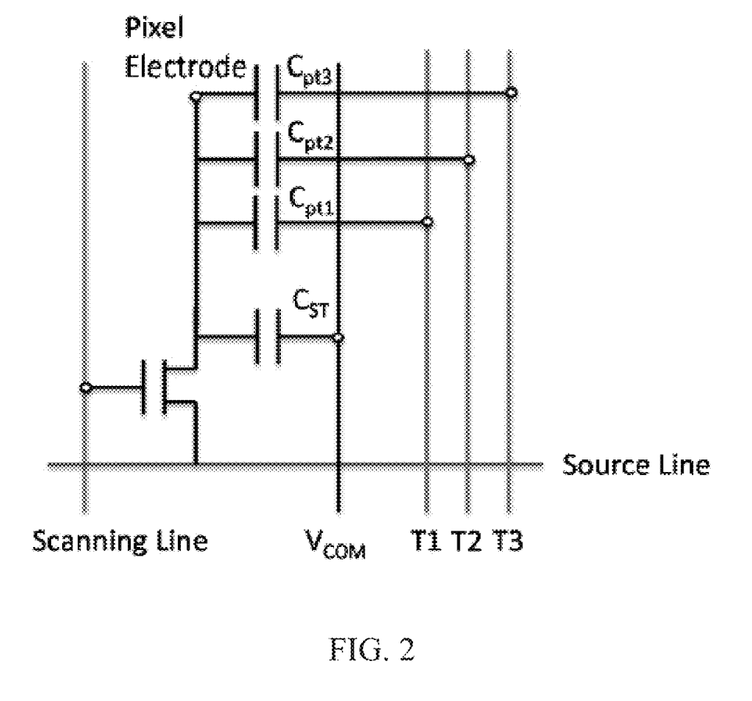
FIG. 2 shows an equivalent circuit model of a pixel wherein T-wires running adjacent a pixel electrode couple capacitively with the pixel electrode.

The performance of electro-optic displays using the design of FIG. 1B are degraded by capacitive coupling between the pixel electrodes and the underlying T-wires. FIG. 2 shows an equivalent circuit model of a single pixel of the type that may be used in the pixel arrays of FIGS. 1A, 1B, 3A, and 3B. In FIG. 2 the capacitive coupling of three underlying T-wires is depicted as $C_{pt1}$, $C_{pt2}$, and $C_{pt3}$, however fewer or more than three wires may be included in the model as correspond to the number of wires running proximate to a pixel.

Figure 3A:
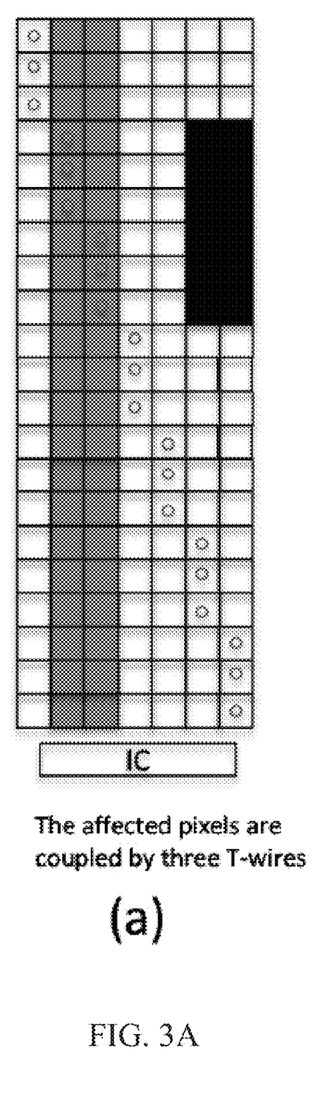
FIG. 3A shows conventional placement of vias on a backplane relative to the pixel array wherein the T-wires for several adjacent rows of pixels are associated with the same column of pixels.

Because of the additive effects of capacitive coupling from several T-wires, spurious or inappropriate activation of multiple adjacent pixels may lead to a phenomenon known as "ghosting" (e.g., a lack of clean switching in a vertical group of pixels to a gray or black appearance, as shown in FIG. 3A, when the pixel display state is supposed to be white). Because of this capacitive coupling, one or more rows that are nominally in a first state are actually pulled toward their last state, i.e., they retain a memory of their last state that is visible in their new state. Furthermore, as shown in FIG. 2, each of the T-wires that receives a voltage when the corresponding source line is activated adds to the total capacitance. Thus, when a block of adjacent pixels is activated, multiple adjacent T-wires are simultaneously activated, resulting in stronger ghosting in the pixels adjacent the T-wires. The effect is illustrated in comparing FIGS. 3A and 3B.

The ghosting phenomenon is more pronounced in situations such as that shown in FIG. 1B in which the panel has many more pixels in one dimension than in the other (orthogonal) dimension. Situations such as these require there to be multiple T-wires running adjacent to each column of pixels in order to make connections to all of the source lines. Thus, if several of the T-wires associated with a particular column of pixels are activated at the same time this causes capacitive coupling, with the resultant ghosting, of that column of pixels.

While the total capacitive coupling is approximately the same regardless of the arrangement of the T-wires and vias, a user perceives much less (or no) ghosting when the vias are distributed according to the invention. In the particular example shown in FIGS. 3A and 3B, twelve pixels on the right side of the display panel are activated to turn black. To display the vertical black rectangle, the three T-wires in each of the second and third columns deliver the same voltage sequence, which is different from the rest of T-wires in the panel. As a result, the capacitive coupling effect in the pixels of the two columns are different from the others, leading to the observable band of activation of the pixel columns. That is, given the distribution of vias in the panel of FIG. 3A, the T-wires that are associated with the source lines needed to activate the group of dark pixels (upper right hand side) are adjacent the second and third columns of pixels. Thus, activating the 12-pixel block in FIG. 3A requires activation of six T-wires, three of which are adjacent to the second column of pixels and three of which are adjacent to the third column of pixels. As shown in FIG. 3A, each of the second and third columns of pixels is at least partially activated due to capacitive coupling that occurs between the groups of T-wires and the pixel electrodes, causing ghosting of these columns of pixels.

To address this problem, in one embodiment the vias may be formed in the panels in a pattern that results in an arrangement of T-wires in which the T-wires that couple to the source lines of two adjacent pixel rows are associated with different pixel columns. In the particular embodiment shown in FIG. 3B, one way to create this distribution of T-wires is to locate the vias in a staggered, or "zigzag," pattern in which the vias are arranged in a diagonal pattern that extends back and forth across the width of the panel, such that each of the plurality of T-wires are connected to row lines associated with a plurality of non-adjacent rows. As seen in the example zigzag design in FIG. 3B, the vias within the same column are vertically separated (e.g., by four or more intervening rows) and they are horizontally separated (e.g., by at least one column), which reduces the likelihood of two or more T-lines in the same column being simultaneously activated when a contiguous block of nearby pixels is displayed. Of course, various types of separations are available. Nearest neighbor vias may be separated by, e.g., at least one pixel row, e.g., at least two pixel rows, e.g., at least three pixel rows, e.g., at least four pixel rows, and/or by at least one pixel column, e.g., at least two pixel columns, e.g., at least three pixel r columns, e.g., at least four pixel columns.

Figure 3B:
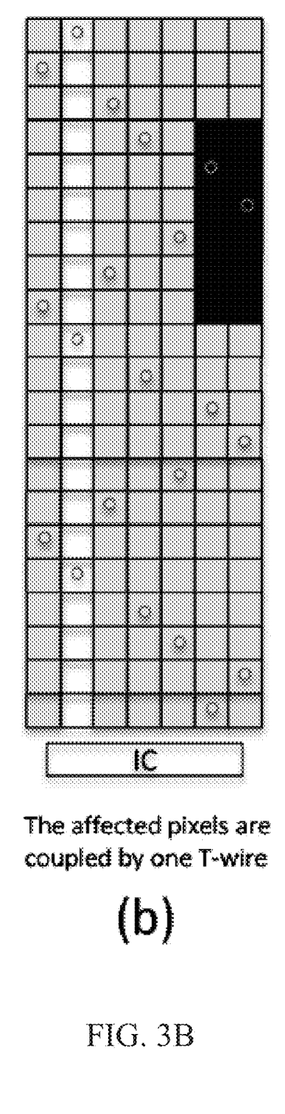
FIG. 3B shows an embodiment of the invention (i.e. a zigzag design) in which the T-wires associated with adjacent

As shown in FIG. 3B, the vias corresponding to adjacent source lines are associated with different pixel columns so that when pixels in adjacent rows are activated, each of the T-wires is associated with a different pixel column. That is, the zigzag via hole design separates the via holes in each column and hence decreases the probability of capacitive coupling from the three T-wires occurring at the same time. In the particular embodiment shown in FIG. 3B, the maximum number of T-wires in each pixel column that delivers the voltage sequences for black is one. Hence, the reduced difference of luminance shift between each pixel column leads to a reduction in ghosting. A further advantage of the zigzag via design is that adjacent data lines have similar RC loading, which reduces or eliminates ghosting due to differences in RC delays between adjacent data lines. Thus, using this design one can separate vias associated with adjacent rows into different pixel columns while maintaining a similar RC constant for the adjacent data lines/T-wires.

However, if RC delays are not a concern (e.g. for smaller display panel sizes), a randomly-distributed via hole design may also be used to address T-wire induced ghosting. For example, in one embodiment the vias may be distributed in a random or pseudorandom arrangement. In one particular embodiment, the random or pseudorandom arrangement can be coupled with other rules such as prohibiting an arrangement of vias that leads to two or more T-wires that are associated with adjacent pixel rows being adjacent the same pixel column. A pseudorandom number generator, for example, may be used to generate a sequence of numbers representing the order of vias. Compared with the zigzag via design, an advantage of a random or pseudorandom via arrangement is that it can avoid the ghosting which might occur in the zigzag design when displaying images having a periodic structure.

As generating images often involves simultaneous activation of groups of adjacent pixels, changing the distribution of vias to stagger the T-wires as shown in FIG. 3B helps reduce or eliminate the ghosting phenomenon associated with activation of blocks of adjacent pixels. In general, the proposed via designs separate the vias within each pixel column which decreases the probability of multiple (e.g. three) T-wires simultaneously delivering the same signal. Hence, the luminance shift due to the capacitive coupling from the T-wires to the pixel electrode is minimized.

Figure 4:
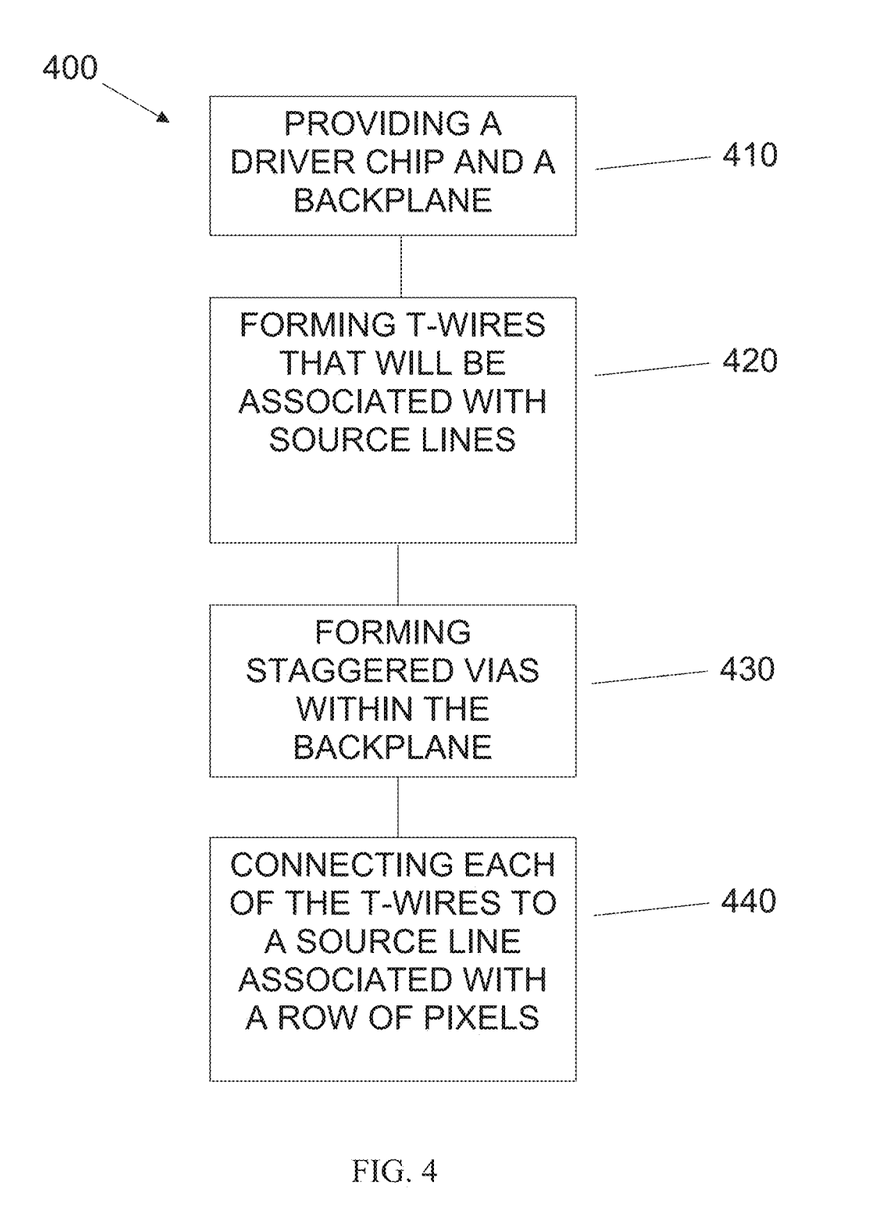
FIG. 4 is a flow chart of a process for forming an electro-optic display using the methods of the invention.

FIG. 4 is a flow chart of an exemplary process 400 for forming an electro-optic display. The process 400 includes a step of providing a driver chip and a backplane (step 410). The backplane may include a substrate having a plurality of pixel electrodes arranged in an array of pixel rows and pixel columns, where each of the pixel rows has a row line associated therewith. The process 400 may also include a step of forming a plurality of T-wires associated with at least one of the pixel columns (step 420). Each of the plurality of T-wires may be connected to the driver chip. The process 400 may further include a step of forming a plurality of vias within the backplane (step 430) such that no two nearest neighbor vias are associated with adjacent pixel rows of any pixel column. The process 400 may also include a step of connecting each of the plurality of T-wires to a respective plurality of row lines (step 440) using one of the plurality of vias disposed within the backplane. Process 400 of FIG. 4 may be used to produce displays such as those disclosed herein including the display panel shown in FIG. 3B.

Figure 5:
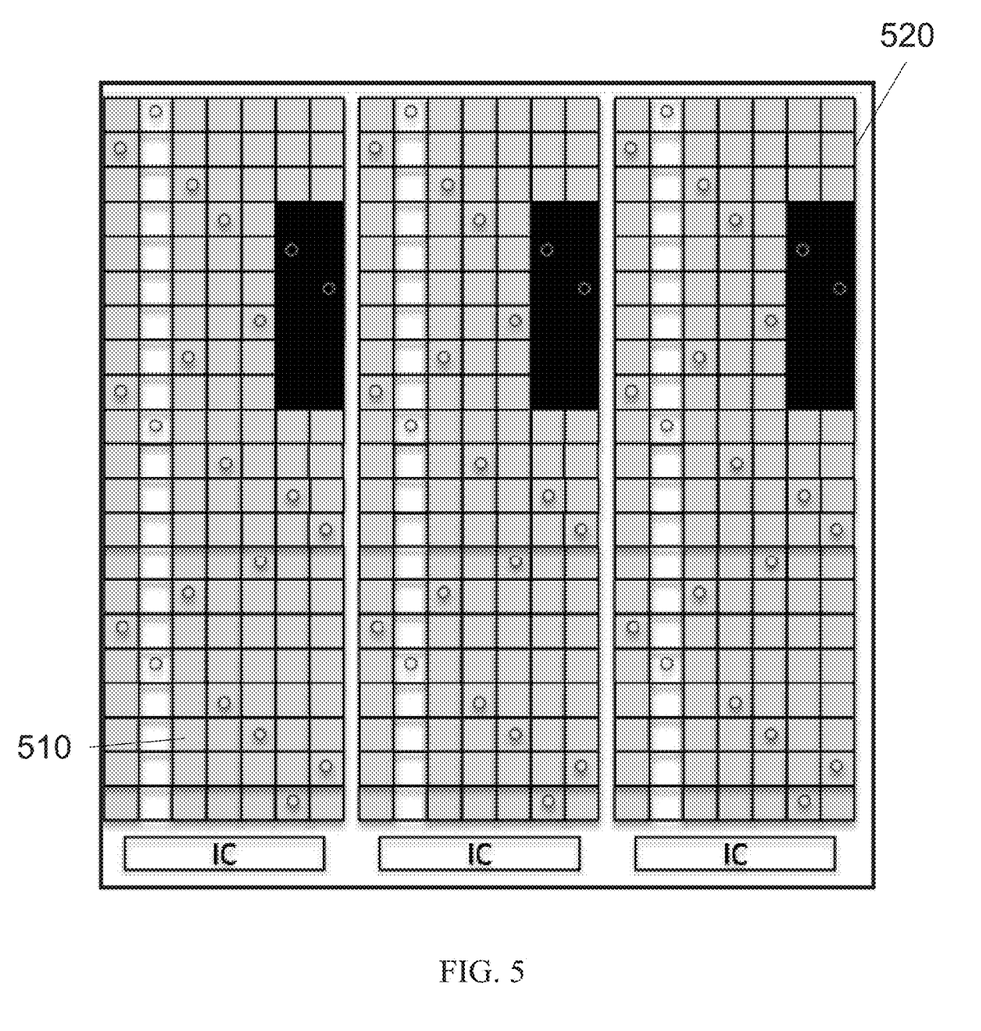
FIG. 5 depicts a tiled display comprising three backplanes of the invention.

As shown in FIG. 5, multiple backplanes of the invention may be tiled together to create a large format display. For example, three backplanes 510 may be arranged on a support 520 so that they appear at a distance to be a singular large display. Such constructions are particularly useful for digital signage, and greatly reduce fabrication costs because they can be built in a modular fashion.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

What is claimed is:

1. An electro-optic display, comprising:
a driver chip; and
a backplane comprising a substrate, the substrate including a front side comprising an array of pixel electrodes including pixel rows and pixel columns, wherein there are more pixel rows than pixel columns on the backplane and each pixel electrode has a thin-film transistor associated therewith, each thin-film transistor being coupled to a column line,
each of the pixel rows including a row line running parallel to the pixel row, each row line being coupled to a T-wire and all of the thin-film transistors in the pixel row,
each T-wire also being coupled to the driver chip, wherein each T-wire runs along a back side of the substrate in a direction substantially perpendicular to the row line, and each T-wire transitions to the front side of the substrate through a via,
wherein each via for each T-wire has a nearest neighbor via identifiable by drawing consecutive circles with increasing radii, but having a center at the via for the T-wire, wherein the first time a second via is captured by one of the concentric circles, the second via is the nearest neighbor via, and wherein the via for the T-wire and the nearest neighbor via are not aligned with the same pixel column.

2. The electro-optic display of claim 1, wherein the row lines are source lines.

3. The electro-optic display of claim 2, wherein each pixel column has a respective column line associated therewith.

4. The electro-optic display of claim 3, wherein the column lines are scan lines.

5. The electro-optic display of claim 1, wherein the driver chip is coupled to the substrate.

6. The electro-optic display of claim 1, wherein the substrate comprises a printed circuit board, a flexible circuit, or a microfabricated circuit.

7. The electro-optic display of claim 1, wherein the vias are arranged in a zigzag pattern on the substrate.

8. The electro-optic display of claim 1, wherein the vias are arranged in a pseudo-random pattern on the backplane.

9. The electro-optic display of claim 1, wherein each via comprises a conductive material disposed in an opening in the backplane.

10. The electro-optic display of claim 1, wherein the electro-optic display further comprises an electrophoretic medium.

11. A method of forming an electro-optic display, comprising:
- providing a driver chip and a backplane, wherein the backplane comprises a substrate having a plurality of pixel electrodes arranged in an array of a plurality of pixel rows and a plurality of pixel columns on a front side of the substrate, wherein there are more pixel rows than pixel columns and each pixel electrode has a thin-film transistor associated therewith, each thin-film transistor being coupled to a row line and a column line, and wherein each of the plurality of pixel rows has a row line coupled to all of the thin-film transistors in the pixel row;
- forming a first plurality of T-wires associated with a first pixel column of the plurality of pixel columns on a back side of the substrate, wherein each of the first plurality of T-wires is connected to the driver chip;
- forming a first plurality of vias within the backplane such that no two vias are associated with adjacent pixel rows of any pixel column, and such that each via has a nearest neighbor via identifiable by drawing consecutive circles with increasing radii, but having a center at the via, wherein the first time a second via is captured by one of the concentric circles, the second via is the nearest neighbor via, and wherein for each via of the first plurality of vias the via and the nearest neighbor via are not aligned with the same pixel column; and
- connecting each of the first plurality of T-wires to a respective one of a first plurality of row lines using one of the first plurality of vias disposed within the backplane.

12. The method of claim 11, further comprising:
- forming a second plurality of T-wires associated with a second pixel column of the plurality of pixel column, wherein each of the second plurality of T-wires is connected to the driver chip;
- forming a second plurality of vias within the backplane such that no two vias are associated with adjacent pixel rows of any pixel column; and
- connecting each of the second plurality of T-wires to a respective one of a second plurality of row lines using one of the second plurality of vias disposed within the backplane.

13. The method of claim 12, wherein the first plurality of row lines and the second plurality of row lines are source lines.

14. The method of claim 11, wherein each of the plurality of column lines is a scan line.

15. The method of claim 11, wherein the driver chip is coupled to the substrate.

16. The method of claim 11, wherein the backplane is a printed circuit board, a flex circuit, or a substrate of printed layers.

17. The method of claim 11, wherein the first plurality of vias and the second plurality of vias are arranged in a zigzag pattern on the backplane.

18. The method of claim 11, wherein the first plurality of vias and the second plurality of vias are arranged in a pseudo-random pattern on the backplane.

19. The method of claim 11, wherein forming a first plurality of vias further comprises:
- forming a first plurality of openings in the backplane, and
- filling each of the first plurality of openings with a conductive material.

\* \* \* \* \*